(12) United States Patent
Han et al.

(10) Patent No.: US 11,543,740 B2
(45) Date of Patent: Jan. 3, 2023

(54) STRUCTURED LIGHT PROJECTOR AND ELECTRONIC APPARATUS INCLUDING THE SAME

(71) Applicant: SAMSUNG ELECTRONICS CO., LTD., Suwon-si (KR)

(72) Inventors: Seunghoon Han, Seoul (KR); Byunghoon Na, Suwon-si (KR); Jangwoo You, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 777 days.

(21) Appl. No.: 16/296,483

(22) Filed: Mar. 8, 2019

(65) Prior Publication Data

US 2020/0050094 A1 Feb. 13, 2020

(30) Foreign Application Priority Data

Aug. 7, 2018 (KR) .................. 10-2018-0092041

(51) Int. Cl.
*G03B 21/20* (2006.01)
*G03B 21/14* (2006.01)
*G02B 27/09* (2006.01)
*G02F 1/01* (2006.01)
*G02B 6/27* (2006.01)

(52) U.S. Cl.
CPC .......... *G03B 21/2033* (2013.01); *G02B 6/27* (2013.01); *G02B 27/0972* (2013.01); *G02F 1/0136* (2013.01); *G03B 21/142* (2013.01)

(58) Field of Classification Search
CPC .... G03B 21/2033; G03B 21/142; G02B 6/27; G02B 27/0972; G02F 1/0136

USPC ........................................ 353/85
See application file for complete search history.

(56) References Cited

U.S. PATENT DOCUMENTS 6,208,451 B1 3/2001 Ito
8,320,226 B2 11/2012 Hirai
10,075,698 B2 9/2018 Kurashige
(Continued)

FOREIGN PATENT DOCUMENTS

CN 1264841 A 8/2000
CN 1682132 A 10/2005
(Continued)

OTHER PUBLICATIONS

Communication issued Jan. 5, 2022 by the China National Intellectual Property Administration in v Chinese Patent Application No. 201910047098.9.

(Continued)

*Primary Examiner* — Jerry L Brooks
(74) *Attorney, Agent, or Firm* — Sughrue Mion, PLLC

(57) ABSTRACT

A structured light projector includes a light source configured to emit light, a structured light pattern mask configured to receive the light emitted by the light source and including a first region configured to generate a first structured light having a first polarization and a second region configured to generate a second structured light having a second polarization that is different from the first polarization, and a polarization multiplexing deflector configured to deflect the first structured light and the second structured light generated by the structured light pattern mask, to different directions, respectively.

26 Claims, 13 Drawing Sheets

(56) References Cited

U.S. PATENT DOCUMENTS

| | | | |
|---|---|---|---|
| 2002/0085280 A1* | 7/2002 | Jung | G02B 30/25 359/487.03 |
| 2004/0201889 A1 | 10/2004 | Wang et al. | |
| 2011/0002039 A1 | 1/2011 | Seo et al. | |
| 2016/0223724 A1 | 8/2016 | Hudman | |
| 2016/0286202 A1 | 9/2016 | Romano et al. | |
| 2017/0118388 A1 | 4/2017 | Wippermann et al. | |
| 2018/0136537 A1 | 5/2018 | Kim et al. | |
| 2019/0137665 A1 | 5/2019 | You et al. | |
| 2019/0204675 A1 | 7/2019 | Wang et al. | |

FOREIGN PATENT DOCUMENTS

| | | | |
|---|---|---|---|
| CN | 101290371 A | 10/2008 | |
| CN | 101840071 A | 9/2010 | |
| CN | 101943800 A | 1/2011 | |
| CN | 102272641 A | 12/2011 | |
| CN | 202281894 U | 6/2012 | |
| CN | 105659106 A | 6/2016 | |
| CN | 106403846 A | 2/2017 | |
| CN | 107817629 A | 3/2018 | |
| CN | 107948622 A | 4/2018 | |
| CN | 107991835 A | 5/2018 | |
| CN | 108072985 A | 5/2018 | |
| CN | 108196391 A | 6/2018 | |
| EP | 1299764 B1 | 5/2004 | |
| JP | 2003-50111 A | 2/2003 | |
| KR | 10-2017-0026458 A | 3/2017 | |
| KR | 10-1826962 B1 | 2/2018 | |
| WO | WO-2012084752 A1 * | 6/2012 | G02F 1/1347 |
| WO | 2013/167152 A1 | 11/2013 | |
| WO | 2015/057625 A1 | 4/2015 | |
| WO | 2018/033917 A1 | 2/2018 | |

OTHER PUBLICATIONS

Communication dated Aug. 2, 2022, issued by the China National Intellectual Property Administration in English counterpart Chinese Application No. 201910047098.9.

* cited by examiner

STRUCTURED LIGHT PROJECTOR AND ELECTRONIC APPARATUS INCLUDING THE SAME

CROSS-REFERENCE TO RELATED APPLICATION

This application claims priority from Korean Patent Application No. 10-2018-0092041, filed on Aug. 7, 2018 in the Korean Intellectual Property Office, the disclosure of which is incorporated herein in its entirety by reference.

BACKGROUND

1. Field

Example embodiments of the present disclosure relate to structured light projectors and electronic apparatuses including the same.

2. Description of the Related Art

Recently, in recognizing an object such as a person or a thing, it is increasingly necessary to accurately identify a shape, a position, or a movement of the object through precise three-dimensional (3D) shape recognition. To this end, 3D sensing technology using structured light has been introduced, thereby making a more precise motion recognition possible.

Structured light systems have recently been required to have smaller sizes and higher resolutions in order to be combined with various electronic devices. Optical components such as diffractive optical elements (DOEs) are generally used to form structured light, and volumes of the optical components affect design accuracy and manufacturing requirements.

SUMMARY

One or more example embodiments provide structured light projectors for generating and emitting structured light.

One or more example embodiments also provide electronic apparatuses including structured light projectors.

Additional aspects will be set forth in part in the description which follows and, in part, will be apparent from the description, or may be learned by practice of example embodiments.

According to an aspect of an example embodiment, there is provided a structured light projector including a light source configured to emit light, a structured light pattern mask configured to receive the light emitted by the light source and including a first region configured to generate a first structured light having a first polarization and a second region configured to generate a second structured light having a second polarization that is different from the first polarization, and a polarization multiplexing deflector configured to deflect the first structured light and the second structured light generated by the structured light pattern mask, to different directions, respectively.

The first region may be disposed in a region other than a region where the second region is disposed in the structured light pattern mask.

The structured light projector, wherein at least one of the first region and the second region may include a plurality of nanostructures.

The first region may be a transparent region, and the second region may include a plurality of nanostructures having a shape distribution configured to change a polarization of light emitted by the light source into the second polarization.

The each of the plurality of nanostructures may have elliptic cylindrical shape.

The structured light projector, wherein, in each of the elliptic cylindrical shapes, a length of a major axis and a length of a minor axis may be determined so that a difference between phase shifts of two electric field components of incident light that are perpendicular to each other is $\pi$.

The each of the plurality of nanostructures may have asymmetric polygonal prism cross-sectional shape.

The first region may include a plurality of first nanostructures, each of the plurality of first nanostructures having a sub-wavelength dimension that is less than a wavelength of light emitted by the light source, and the second region may include a plurality of second nanostructures, each of the plurality of second nanostructures having the sub-wavelength dimension.

The plurality of first nanostructures included in the first region may have a shape distribution configured to change a polarization of light emitted by the light source into the first polarization, and the plurality of second nanostructures of the second region may have a shape distribution configured to change the polarization of light emitted by the light source into the second polarization.

The plurality of first nanostructures and the plurality of second nanostructures may have elliptic cylindrical cross-sectional shapes with a major axis and a minor axis, respectively, and the plurality of first nanostructures and the plurality of second nanostructures may be different from each other in at least one of a direction of the major axis and an aspect ratio, the aspect ratio being a ratio between a length of the major axis and a length of the minor axis.

The plurality of first nanostructures and the plurality of second nanostructures may have a same aspect ratio, wherein a major axis of each of the plurality of second nanostructures may be inclined at a predetermined angle with respect to a major axis of each of the plurality of first nanostructures.

The plurality of first nanostructures and the plurality of second nanostructures may have asymmetric polygonal prism cross-sectional shapes having a major axis and a minor axis, respectively, and the plurality of first nanostructures and the plurality of second nanostructures may be different from each other in at least one of a direction of the major axis and an aspect ratio, the aspect ratio being a ratio between a length of the major axis and a length of the minor axis.

The plurality of first nanostructures of the first region may have a shape distribution configured to preserve a polarization of the light emitted by the light source as the first polarization, and the plurality of second nanostructures of the second region may have a shape distribution configured to change the polarization of the light emitted by the light source into the second polarization.

The plurality of first nanostructures may have circular cylindrical cross-sectional shapes, and the plurality of second nanostructures may have elliptic cylindrical cross-sectional shapes with a major axis and a minor axis.

The first polarization and the second polarization may be linear polarizations that are perpendicular to each other.

The structured light projector, wherein one of the first polarization and the second polarization may be a left-handed circular polarization and the other one may be a right-handed circular polarization.

The polarization multiplexing deflector may include a plurality of third nanostructures having a first axis and a second axis, each of the plurality of third nanostructures having a sub-wavelength dimension that is less than a wavelength of light emitted by the light source.

The structured light projector, wherein a shape distribution of the plurality of nanostructures may be determined so that a transmission phase distribution varies based on a polarization of incident light.

The structured light projector, wherein each of the plurality of third nanostructures may have asymmetric cross-sectional shapes based on a direction of the first axis being different from a direction of the second axis, and a length of the first axis being different from a length of the second axis.

The structured light projector, wherein a distribution of the first lengths and a distribution of the second lengths of the plurality of third nanostructures may be different from each other.

The structured light projector may further include a transparent substrate including a first surface facing the light source and a second surface opposite to the first surface, wherein the structured light pattern mask is disposed on the first surface, and the polarization multiplexing deflector is disposed on the second surface.

According to an aspect of an example embodiment, there is provided an electronic apparatus including a structured light projector, and a sensor configured to receive light from the object which is irradiated with light emitted by the structured light projector, and a processor configured to obtain shape information of the object based on the light received by the sensor, wherein the structured light projector includes a light source configured to emit light, a structured light pattern mask configured to receive the light emitted by the light source and including a first region configured to generate a first structured light having a first polarization and a second region configured to generate a second structured light having a second polarization, the second polarization being different from the first polarization, and a polarization multiplexing deflector configured to deflect the first structured light and the second structured light generated by the structured light pattern mask, to different directions, respectively.

The shape distribution may include at least one of a shape, a size, and a pitch of each of the plurality of nanostructures, respectively.

The shape distribution may include at least one of a shape, a size, and a pitch of each of the plurality of third nanostructures, respectively.

According to an aspect of an example embodiment, there is provided a structured light projector including a light source configured to emit light, a structured light pattern mask configured to receive the light emitted by the light source and including a first region configured to generate a first structured light having a first polarization, and a second region configured to generate a second structured light having a second polarization, the second polarization being different from the first polarization, and a polarization multiplexing deflector configured to deflect the first structured light and the second structured light generated by the structured light pattern mask, to different directions, respectively, wherein the first region includes a plurality of first nanostructures, and the polarization multiplexing deflector includes a plurality of third nanostructures.

The second region may include a plurality of second nanostructures.

The structured light projector, wherein an angle between a major axis of each of the plurality of first nanostructures and a major axis of each of the plurality of second nanostructures may be a predetermined angle.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
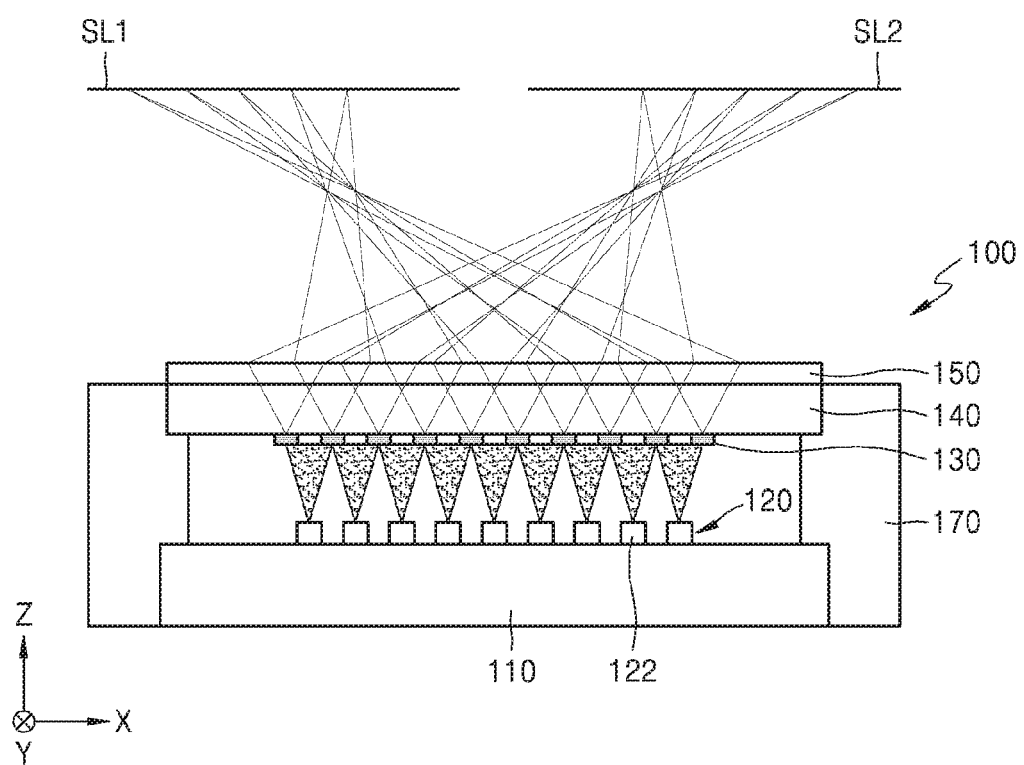
FIG. 1 is a cross-sectional view illustrating a configuration of a structured light projector according to an example embodiment.

The present disclosure now will be described more fully hereinafter with reference to the accompanying drawings, in which example embodiments of the disclosure are shown. The present disclosure may, however, be embodied in many different forms and should not be construed as limited to the example embodiments set forth herein. Throughout the drawings, the same drawing reference numerals will be understood to refer to the same elements. A size of each element may be exaggerated for clarity and convenience of explanation.

When a first element is "on" or "over" a second element, it may include a case where the first element contacts the second element and is directly located on the second element, and a case where the first element does not contact the second element and is located on the second element with a third element therebetween.

While such terms as "first", "second", etc., may be used to describe various components, the above terms are used only to distinguish one component from another. The terms do not mean that materials or structures of elements are different.

An expression used in the singular encompasses the expression of the plural, unless it has a clearly different meaning in the context. Throughout the specification, when a portion "includes" an element, another element may be further included, rather than excluding the existence of the other element, unless otherwise described.

Also, the terms, such as "unit" or "module", should be understood as a unit that performs at least one function or operation and may be implemented in hardware, software, or a combination of hardware and software.

The particular implementations shown and described herein are illustrative examples of the disclosure and are not intended to limit the scope of the disclosure in any way. For the sake of brevity, conventional electronics, control systems, software development, and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections, or logical connections may be present in a practical device.

The use of the terms "a" and "an", and "the" and similar referents is to be construed to cover both the singular and the plural.

Also, the steps of all methods described herein may be performed in any suitable order unless otherwise indicated herein or otherwise clearly contradicted by context. Also, the use of any and all examples, or exemplary language (e.g., "such as") provided herein, is intended merely to better illuminate the disclosure and does not pose a limitation on the scope of the disclosure unless otherwise claimed.

Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 2:
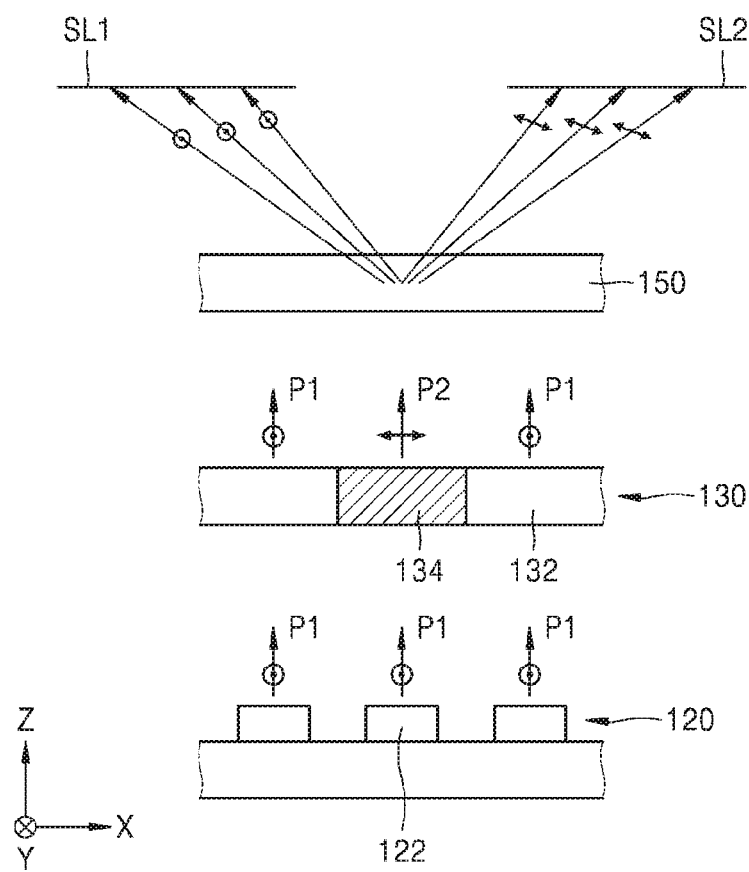
FIG. 2 is a partially enlarged conceptual view of FIG. 1, illustrating an optical path in which structured light is formed at different positions according to polarizations of light.
Figure 3:
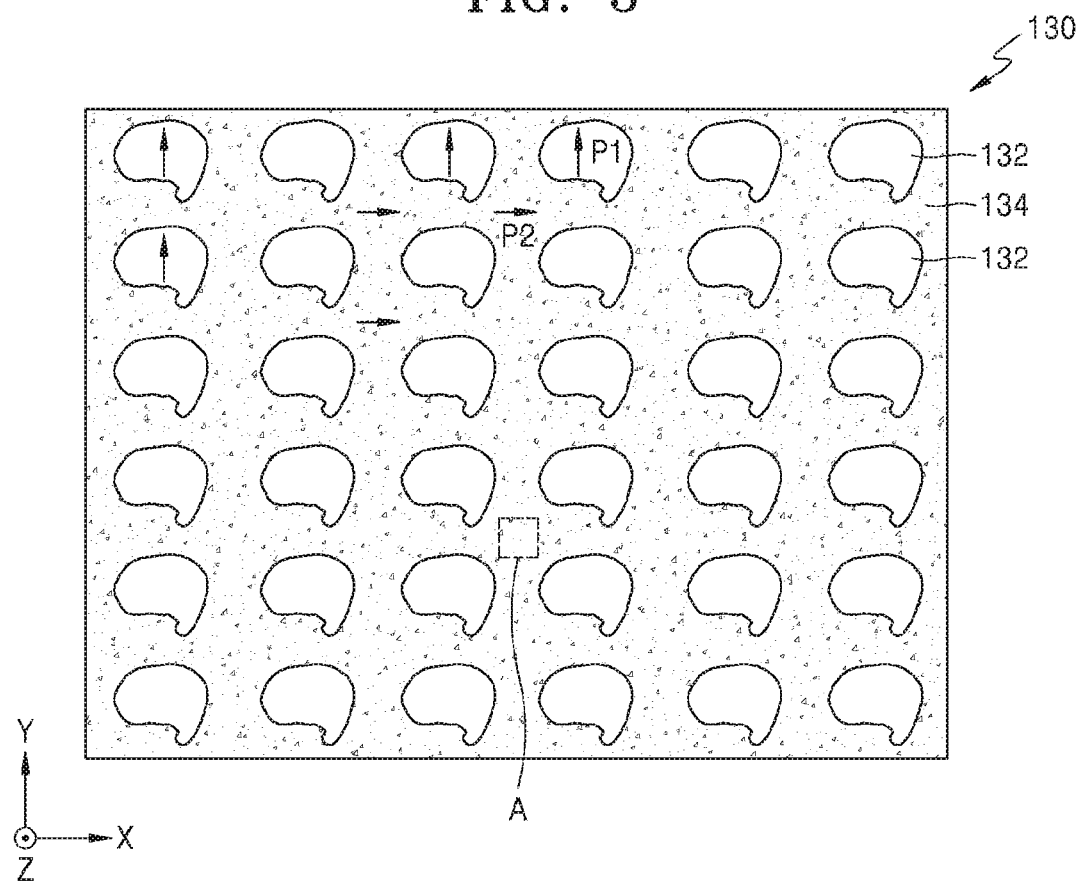
FIG. 3 is a plan view of a structured light pattern mask used in the structured light projector of FIG. 1.

FIG. 1 is a cross-sectional view illustrating a configuration of a structured light projector 100 according to an example embodiment. FIG. 2 is a partially enlarged conceptual view of FIG. 1, illustrating an optical path in which structured light is formed at different positions according to polarizations of light. FIG. 3 is a plan view of a structured light pattern mask 130 used in the structured light projector 100 of FIG. 1.

The structured light projector 100 includes a light source 120, the structured light pattern mask 130 configured to form first structured light SL1 formed of light of a first polarization and second structured light SL2 formed of light of a second polarization, and a polarization multiplexing deflector 150 configured to deflect the first structured light SL1 and the second structured light SL2 formed by the structured light pattern mask 130 to different directions. The structured light projector 100 may further include a substrate 110 configured to support the light source 120, a transparent substrate 140 configured to support the structured light pattern mask 130 and the polarization multiplexing deflector 150, and a housing 170 configured to fix the substrate 110 and the transparent substrate 140.

The light source 120 may include an array of light-emitting elements 122. Each of the light-emitting elements 122 may be a light-emitting diode (LED) or a laser diode that emits laser light. The light-emitting element 122 may be a vertical-cavity surface-emitting laser (VCSEL). The light-emitting element 122 may include an active layer formed of, but not limited to, a Group III-V semiconductor material or a Group II-VI semiconductor material and having a multi-quantum well structure. The light-emitting element 122 may emit laser light having a wavelength ranging from about 850 nm to about 940 nm, or may emit light having a near-infrared or visible wavelength band. A wavelength of light emitted by the light-emitting element 122 is not limited to a specific wavelength, and the light-emitting element 122 that emits light having a wavelength band for an application using the first structured light SL1 and the second structured light SL2 may be used.

The light-emitting element 122 may emit light of a predetermined polarization. For example, as shown in FIG. 2, the light-emitting element 122 may emit light of a first polarization P1. The first polarization P1 may be, but is not limited to, a Y-direction linear polarization. For example, the first polarization P1 may be an X-direction linear polarization or, a linear polarization including both an X-direction polarization component and a Y-direction polarization component, or a circular polarization.

The structured light pattern mask 130 includes a first region 132 that maintains a polarization state of incident light and transmits light therethrough, and a second region 134 that changes a polarization state of incident light and transmits light therethrough.

The first region 132 has a pattern for forming predetermined structured light. Structured light may be a distribution of a beam spot formed by a ray of light traveling in a space. The distribution of the beam spot may be determined by a shape of the first region 132. The structured light may be a pattern mathematically coded so that an angle and a direction of a ray of light and position coordinates of bright and dark dots are unique. The pattern may be used to recognize a three-dimensional (3D) shape. A shape of the structured light emitted to a 3D object may be changed by the 3D object, and the change in the shape of the structured light may be imaged by an image pickup device such as a camera to track a degree of change in the pattern according to coordinates, thereby making it possible to track depth information of the 3D object.

The first region 132 may maintain a polarization of incident light and may form structured light. The first region 132 may be a transparent region. A shape of the first region 132 may be determined to form a desired structured light pattern. Although the first regions 132 having the same shape are repeatedly formed in FIG. 3, the present embodiment is not limited thereto, and the first regions 132 having various shapes may be distributed randomly, periodically, or pseudo-periodically. The light of the first polarization P1 emitted by the light source 120 passes through the first region 132 and maintains the first polarization P1. Also, since predetermined structured light is formed according to a shape of the first region 132, the first structured light SL1 formed of the light of the first polarization P1 may be formed by the first region 132.

The second region 134 may change a polarization of incident light. For example, the second region 134 may change the light of the first polarization P1 emitted by the light source 120 into the light of the second polarization P2. To this end, the second region 134 includes nanostructures of predetermined requirements, as described with reference to FIGS. 4 through 6C.

The second region 134 also has a pattern for forming predetermined structured light. The light of the first polarization P1 emitted by the light source 120 may be modulated into the second structured light SL2 formed of the light of the second polarization P2 by passing through the second region 134. A portion of the structured light pattern mask 130 other than the first region 132 may become the second region 134, and thus, the second region 134 and the first region 132 have complementary patterns. Accordingly, the second structured light SL2 formed by passing through the second region 134 may have a pattern complementary to that of the first structured light SL1.

The first structured light SL1 of the first polarization and the second structured light SL2 of the second polarization formed by passing through the first region 132 and the second region 134 of the structured light pattern mask 130, respectively, may pass through the polarization multiplexing deflector 150 and may be separated into different directions.

Figure 10:
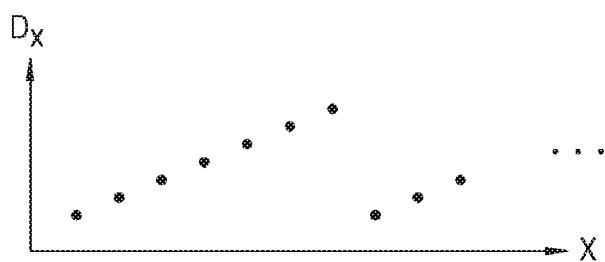
FIG. 10 is a graph illustrating an X-direction length distribution of the nanostructures included in the polarization multiplexing deflector of FIG. 9 in an X-direction.
Figure 11:
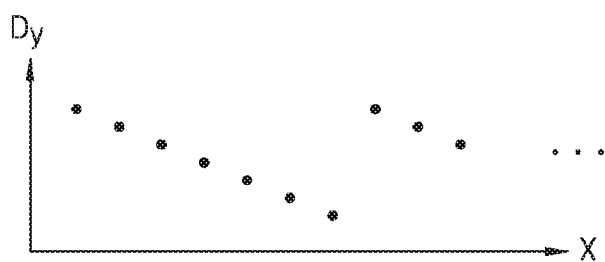
FIG. 11 is a graph illustrating a Y-direction length distribution of the nanostructures included in the polarization multiplexing deflector of FIG. 9 in the X-direction.

The polarization multiplexing deflector 150 may deflect incident light to different directions according to a polarization state of incident light, and may include, for example, a plurality of nanostructures that have predetermined shapes and are regularly arranged, as described with reference to FIGS. 9 through 11.

The structured light projector 100 according to an example embodiment may form structured light in a different angular space and a different direction according to a polarization and may provide structured light with a wide field of view.

The structured light projector 100 according to an example embodiment may form structured light with relatively high light efficiency. The first structured light SL1 may be formed by configuring the second region 134 as a light-blocking region. According to an example embodiment, since the second structured light SL2 having a pattern complementary to that of the first structured light SL1 is further formed through the second region 134 in addition to the first structured light SL1, the efficiency of using light emitted by the light source 120 may be higher.

According to an example embodiment, the first polarization P1 and the second polarization P2 are linear polarizations that are perpendicular to each other, but example embodiments are not limited thereto. For example, one of the first polarization P1 and the second polarization P2 may be a left-handed circular polarization and the other one may be a right-handed circular polarization.

Figure 4:
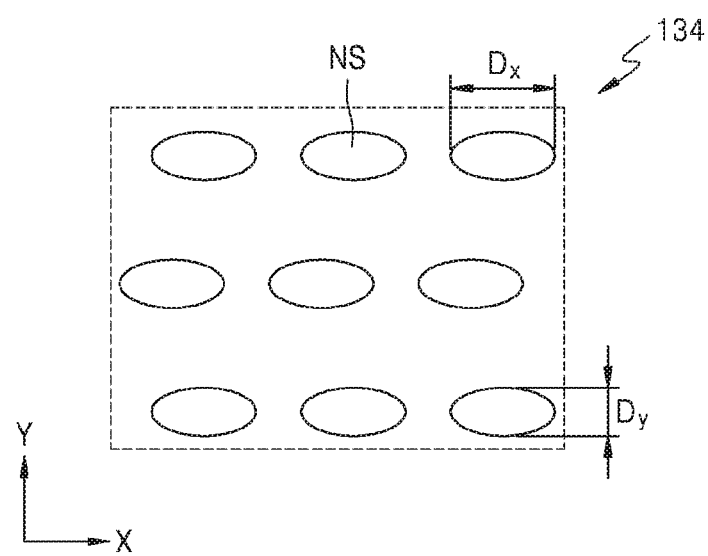
FIG. 4 is a partially enlarged plan view illustrating a second region of the structured light pattern mask of FIG. 3.
Figure 5:
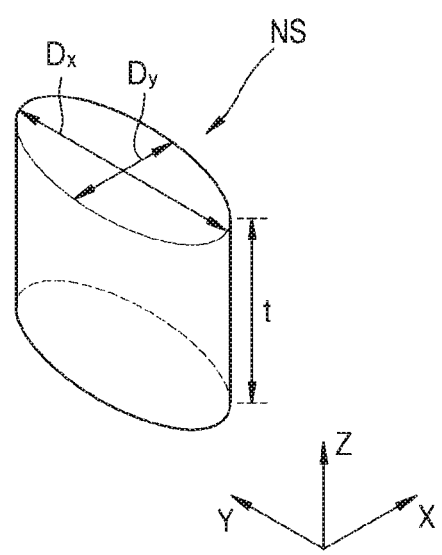
FIG. 5 is a perspective view illustrating an example shape of a nanostructure used in the second region of the structured light pattern mask of FIG. 3.

FIG. 4 is a partially enlarged plan view illustrating the second region 134 of the structured light pattern mask 130 of FIG. 3. FIG. 5 is a perspective view illustrating a shape of a nanostructure used in the second region 134 of the structured light pattern mask 130 of FIG. 3.

A plurality of nanostructures NS may be formed in the second region 134. Each of the nanostructures NS may have a sub-wavelength shape dimension. The shape dimension may include a dimension of a thickness or a width, that is used to define a shape of the nanostructure NS, and when a member has a sub-wavelength shape dimension, at least one of shape dimensions is less than a wavelength of light emitted by the light source 120.

A shape dimension of the nanostructure NS may be equal to or less than half a wavelength of light emitted by the light source 120. A pitch between the plurality of nanostructures NS may be equal to or less than half a wavelength of light emitted by the light source 120. When a width of the nanostructure NS is equal to or less than half a wavelength, the nanostructure NS may operate as an antenna scattering unit having a meta-structure, and the smaller the pitch of the nanostructure becomes, below a wavelength, the more incident light may be controlled to have a desired shape without high order diffraction.

The nanostructure NS may be formed of a dielectric material. The nanostructures NS may be formed of a material having a refractive index higher than a refractive index of an adjacent material, for example, air or a substrate supporting the nanostructure NS. A difference between the refractive index of the nanostructure NS and the refractive index of the ambient material may be equal to or greater than 1.

The nanostructure NS may be formed of any one of monocrystalline silicon, polycrystalline silicon (poly-Si), amorphous silicon, silicon nitride ($Si_3N_4$), gallium phosphide (GaP), titanium dioxide ($TiO_2$), aluminum antimonide (AlSb), alumanylidynearsane (AlAs), aluminium gallium arsenide (AlGaAs), aluminium gallium indium phosphide (AlGaInP), boron phosphide (BP), and zinc-germanium diphosphide ($ZnGeP_2$).

According to an example embodiment, the nanostructure NS may be formed of a conductive material. A metal material having high conductivity and capable of causing surface plasmon excitation may be used as the conductive material. For example, at least one of copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), and gold (Au), or an alloy including any of the metals may be used as the conductive material. Also, a conductive oxide or a two-dimensional (2D) material having high conductivity such as graphene may be used as the conductive material.

According to an example embodiment, some of the nanostructures NS may be formed of dielectric materials, and some may be formed of conductive materials. That is, some of the nanostructures NS may be formed of dielectric materials each having a refractive index higher than a refractive index of a substrate, and others of the nanostructures NS may be formed of conductive materials.

The nanostructures NS may have unique transmission intensities and transmission phases according to materials and shapes. A phase or intensity distribution of light transmitted through the second region 134 may be adjusted by adjusting a shape distribution of the nanostructures NS. Shape distribution may be at least one of shapes of the plurality of nanostructures NS, sizes of the plurality of nanostructures NS, a size distribution of the plurality of nanostructures NS, a pitch of the plurality of nanostructures NS, and a pitch distribution of the plurality of nanostructures NS.

A polarization of incident light may be changed by adjusting shapes and an arrangement of the nanostructures NS. The nanostructures NS may have, for example, elliptic cylindrical shapes. In a cross-section of each of the nanostructures NS, a length of a major axis may be $D_x$ and a length of a minor axis may be $D_y$.

Figure 6A:
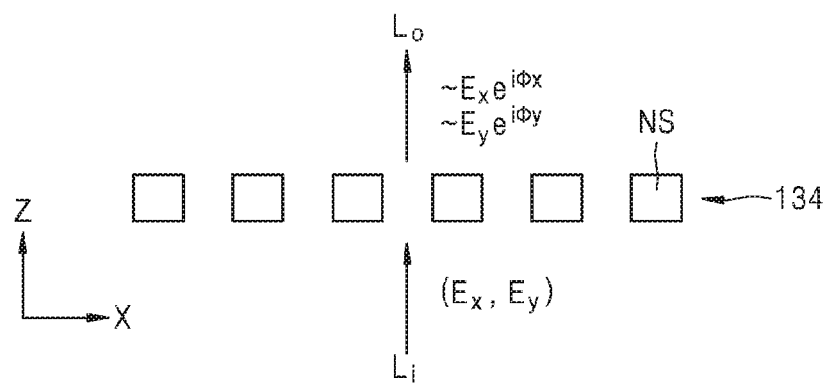
FIG. 6A is a conceptual view for describing a phase shift of an electric field component of light incident on the second region of the structured light pattern mask of FIG. 3.

FIG. 6A is a conceptual view for describing a phase shift of an electric field component of light incident on the second region 134 of the structured light pattern mask 130 of FIG. 3.

A phase of light $L_i$ incident on the second region 134 including the plurality of nanostructures NS may be shifted as the $L_i$ passes through the second region 134. For example, after an X-direction electric field component $E_x$ and a Y-direction electric field component $E_y$ of the light $L_i$ pass through the second region 134, phases of the X-direction electric field component $E_x$ and the Y-direction electric field component $E_y$ of the light $L_i$ may be respectively shifted by $\Phi_x$ and $\Phi_y$. Specific values of $\Phi_x$ and $\Phi_y$ may be determined by a shape dimension of the nanostructure NS and an arrangement of the lengths $D_x$ and $D_y$.

Figure 6B:
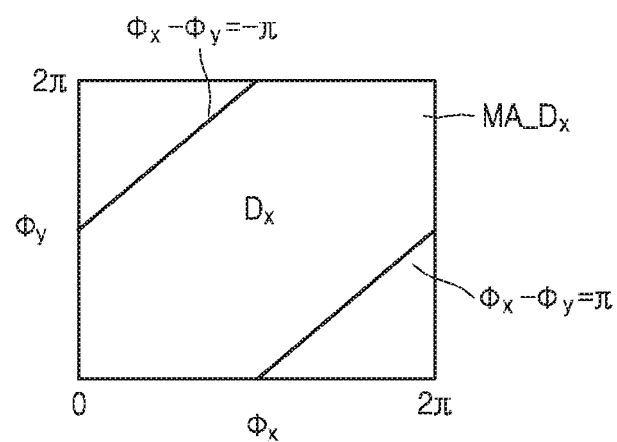
FIGS. 6B and 6C are conceptual views illustrating that a shape dimension of the nanostructure used in the second region of the structured light pattern mask of FIG. 3 may be set to a value suitable for a desired phase shift.
Figure 6C:
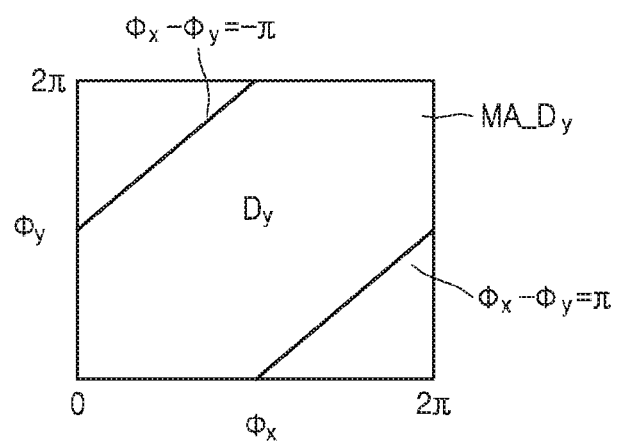

FIGS. 6B and 6C are conceptual views illustrating that a shape dimension of the nanostructure NS used in the second region 134 of the structured light pattern mask 130 of FIG. 3 may be set to a value suitable for a desired phase shift.

The lengths $D_x$ and $D_y$ of a nanostructure NS having the phase shift $\Phi_x$ of the X-direction electric field component $E_x$ and the phase shift $\Phi_y$ of the Y-direction electric field component $E_y$ may be mapped to a ($\phi_x$, $\phi_y$) plane as shown in FIGS. 6B and 6C. A value of the nanostructure NS may be calculated through computer simulation. Distribution diagrams of FIGS. 6B and 6C may show two straight lines, that is, $\phi_x-\phi_y=-\pi$ and $|\phi_x-\phi_y|$ where a difference $|\phi_x-\phi_y|$ between the phase shift $\phi_x$ and the phase shift $\phi_y$ is $\pi$, and the nanostructure NS having a value ($D_x$, $D_y$) at an arbitrary position ($\phi_x$, $\phi_y$) on the straight lines may be selected.

A phase difference $\pi$ between polarization components may be obtained by arranging the nanostructures NS each having a shape dimension selected from the distribution diagram of FIG. 6B or 6C. In other words, a polarization of incident light may be changed into a polarization perpendicular to the polarization of the incident light by using the plurality of nanostructures NS having the shape dimension. For example, an X-direction linear polarization may be changed into a Y-direction linear polarization, and a Y-direction linear polarization may be changed into an X-direction linear polarization. Also, a right-handed circular polarization may be changed into a left-handed circular polarization, and a left-handed circular planarization may be changed into a right-handed circular polarization.

However, example embodiments are not limited thereto. For example, a distribution diagram as shown in FIG. 6B or 6C may be extracted and a shape suitable for polarization conversion from the distribution diagram may be derived by using the nanostructure NS having various asymmetric cross-sectional shapes.

Figure 7:
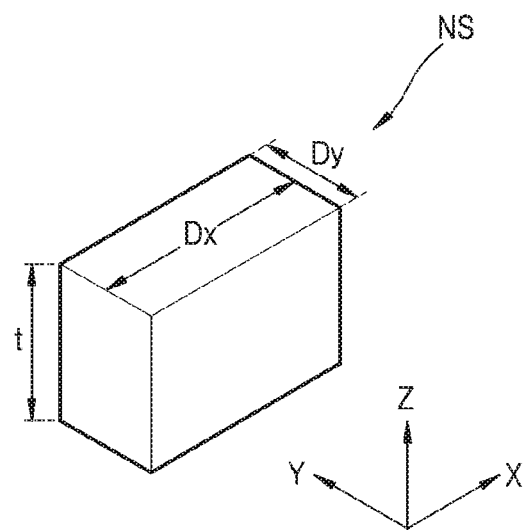
FIGS. 7 and 8 are perspective views illustrating example shapes of the nanostructure that may be used in the second region of the structured light pattern mask of FIG. 3.
Figure 8:
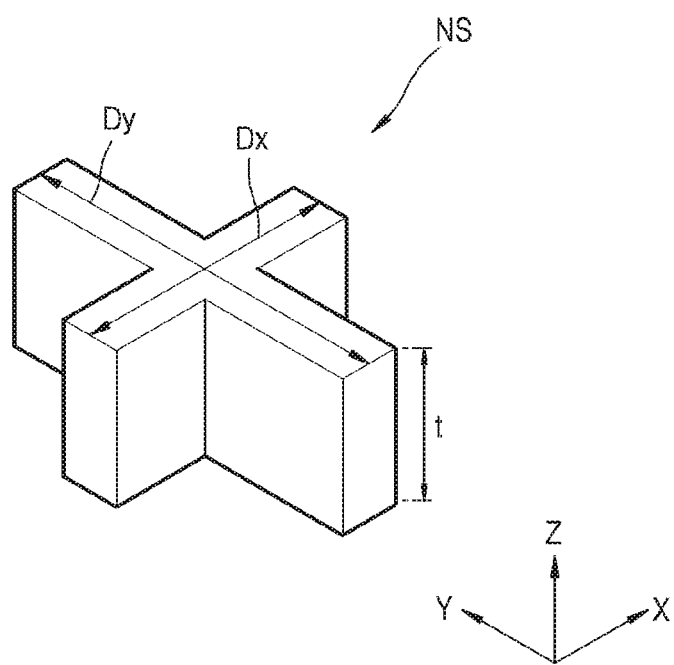

FIGS. 7 and 8 are perspective views illustrating example shapes of the nanostructure NS that may be used in the second region 134 of the structured light pattern mask 130 of FIG. 3.

Referring to FIG. 7, the nanostructure NS may have an asymmetric rectangular parallelepiped shape, a rectangular cross-section with an X-direction length Dx and a Y-direction length Dy, and a thickness t.

Referring to FIG. 8, the nanostructure NS may have a polygonal prism shape, a cross-shaped cross-section parallel to an XY plane, and a thickness t. The cross-shape may be an asymmetric shape in which the X-direction length Dx and the Y-direction length Dy are different from each other.

Figure 9:
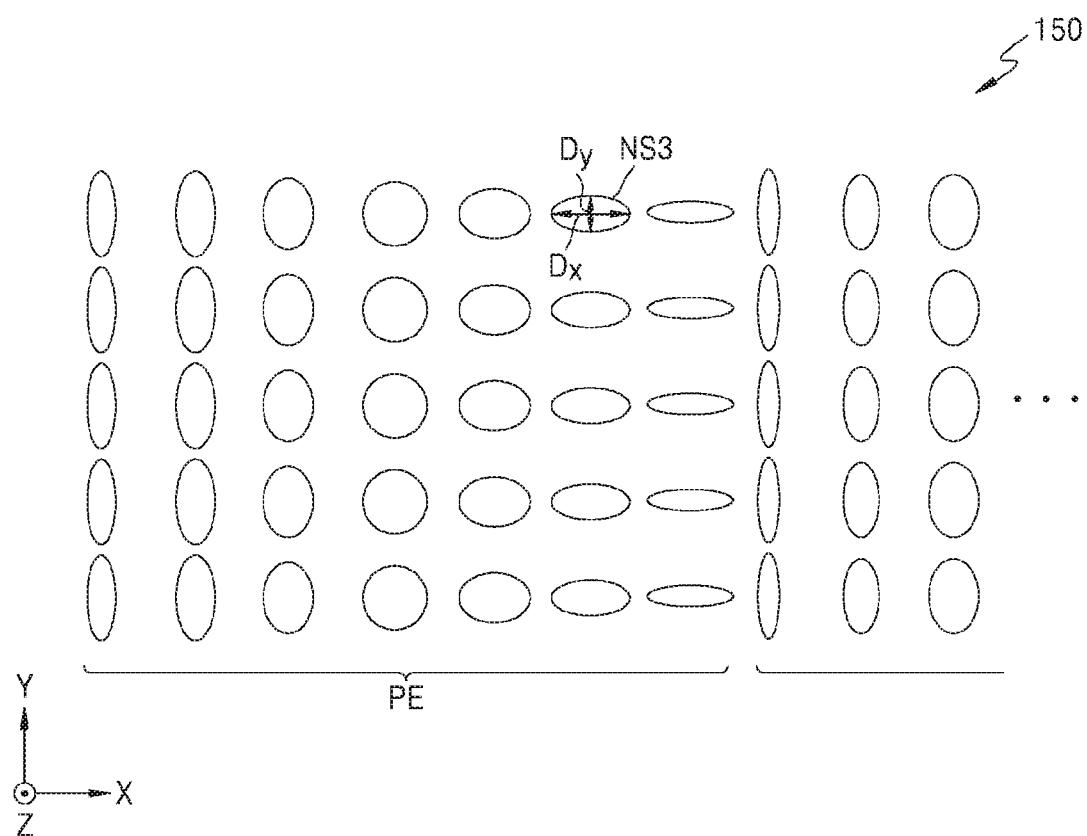
FIG. 9 is a plan view illustrating a structure of a polarization multiplexing deflector used in the structured light projector of FIG. 1.

FIG. 9 is a plan view illustrating a structure of the polarization multiplexing deflector 150 used in the structured light projector 100 of FIG. 1. FIG. 10 is a graph illustrating an X-direction length distribution of the nanostructures NS included in the polarization multiplexing deflector 150 of FIG. 9 in the X-direction. FIG. 11 is a graph illustrating a Y-direction length distribution of the nanostructures NS included in the polarization multiplexing deflector 150 of FIG. 9 in the X-direction.

The polarization multiplexing deflector 150 may include a plurality of nanostructures NS3. A shape distribution of the polarization multiplexing deflector 150 may be determined so that a transmission phase distribution varies according to a polarization of incident light, in order to exhibit different optical actions to incident light of different polarizations.

The plurality of nanostructures NS3 may have asymmetric cross-sectional shapes that may be defined by two lengths having different directions and different sizes. A shape distribution of the plurality of nanostructures NS3 may be determined so that a spatial distribution of the two lengths is achieved under a predetermined rule. FIG. 9 illustrates the nanostructures NS3 have asymmetric cross-sectional shapes, but example embodiments are not limited thereto. For example, shapes as illustrated in FIG. 7 or 8 may be used.

The polarization multiplexing deflector 150 includes the nanostructures NS3 each having the X-direction length Dx and the Y-direction length Dy. As shown in FIG. 9, the X-direction length Dx and the Y-direction length Dy may be different from each other according to the position where each of the nanostructures NS3 are located. The X-direction lengths Dx and the Y-direction lengths Dy may have a predetermined distribution rule in the X-direction. The predetermined distribution rule may be repeated in a predetermined cycle PE. As shown in FIG. 10, the X-direction length Dx may gradually increase in the X-direction, and such a distribution may be repeated in a predetermined cycle. As shown in FIG. 11, the Y-direction length Dy may gradually decrease in the X-direction, and such a distribution may be repeated in a predetermined cycle. Since a distribution of the X-direction lengths Dx and a distribution of the Y-direction lengths Dy of the nanostructures NS3 having asymmetric shapes are different from each other, incident light may be separated into an X-direction polarization component and a Y-direction polarization component and may be deflected to different directions.

As such, incident light of different polarizations may be separated and deflected to different desired directions by variously changing a relative arrangement and X-direction and Y-direction sizes of the nanostructures NS3.

Figure 12:
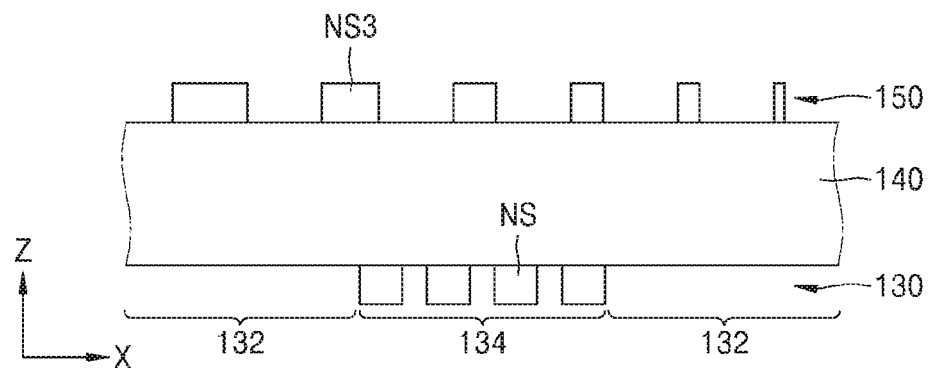
FIG. 12 is a partially enlarged cross-sectional view of FIG. 1, illustrating that the structured light pattern mask and the polarization multiplexing deflector are respectively formed on both surfaces of a transparent substrate.

FIG. 12 is a cross-sectional view illustrating that the structured light pattern mask 130 and the polarization multiplexing deflector 150 are respectively formed on opposite surfaces of the transparent substrate 140.

The structured light pattern mask 130 may be located on a surface facing the light source 120 from among opposite surfaces of the transparent substrate 140. The polarization multiplexing deflector 150 may be located on the other surface of the transparent substrate 140.

The plurality of nanostructures NS provided in the second region 134 of the structured light pattern mask 130 may be formed on a surface of the transparent substrate 140, and the plurality of nanostructures NS3 provided on the polarization multiplexing deflector 150 may be formed on the other surface of the transparent substrate 140.

Based on this monolithic structure, the structured light projector 100 may be made more compact and small.

According to an embodiment, a substrate on which the nanostructures NS constituting the structured light pattern mask 130 are formed and a separate substrate on which the nanostructures NS3 constituting the polarization multiplexing deflector 150 are formed may be attached to each other to form the transparent substrate 140.

Figure 13:
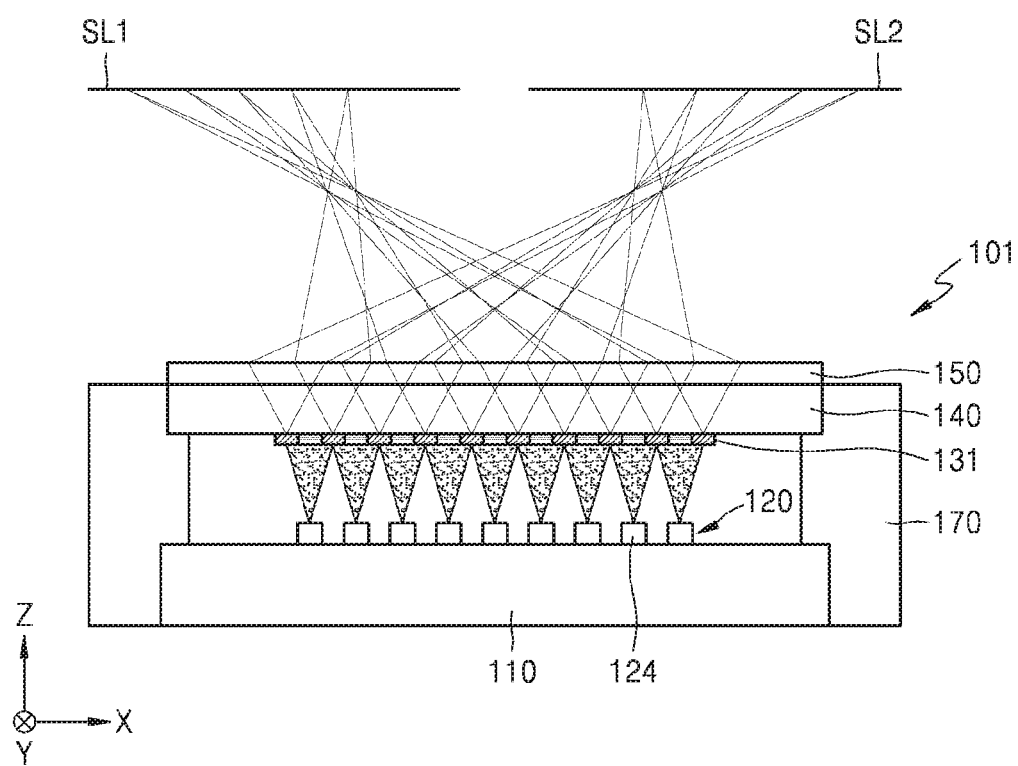
FIG. 13 is a cross-sectional view illustrating a configuration of a structured light projector according to an example embodiment.
Figure 14:
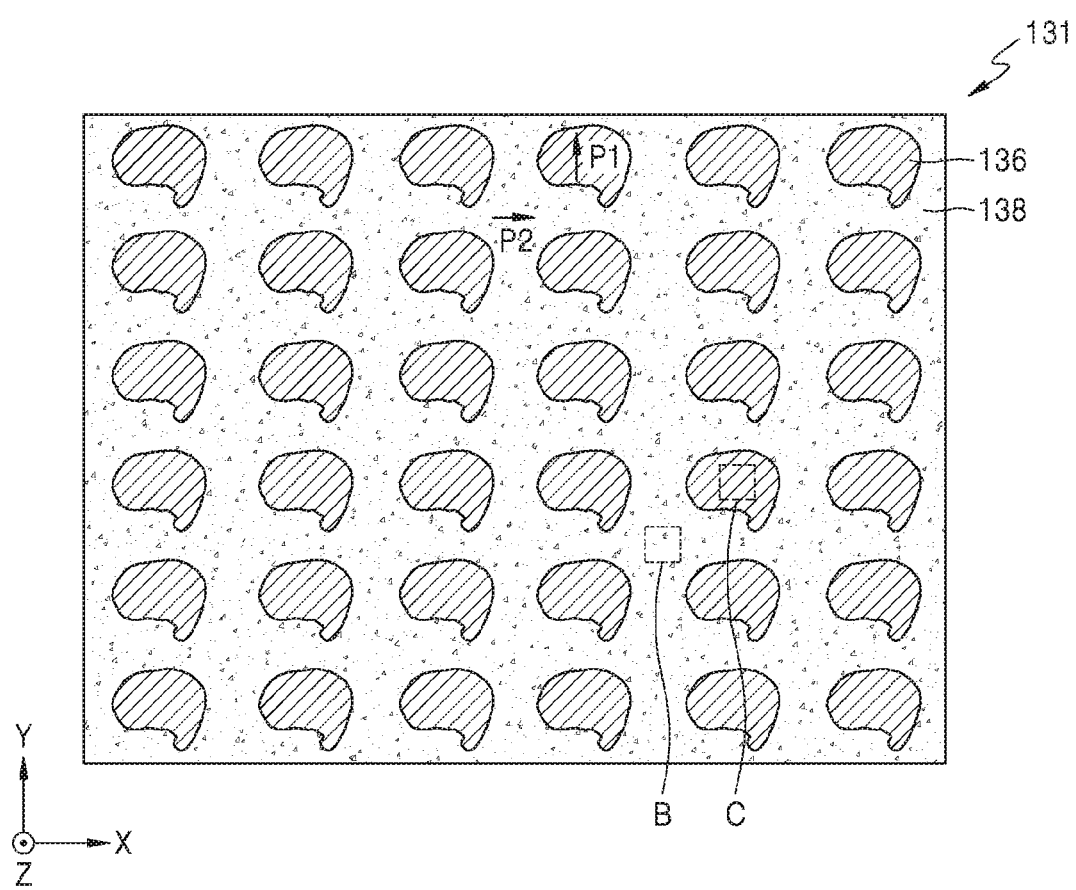
FIG. 14 is a plan view of a structured light pattern mask used in the structured light projector of FIG. 13.
Figure 15:
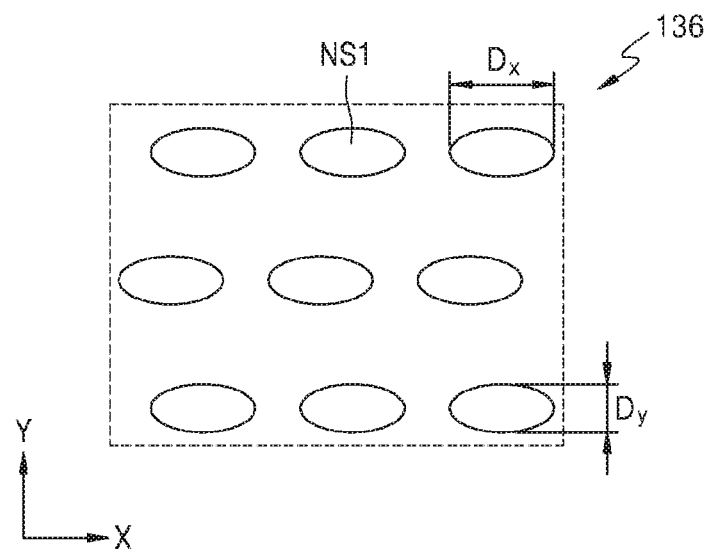
FIG. 15 is an enlarged plan view illustrating a portion of a first region of the structured light pattern mask of FIG. 13.
Figure 16:
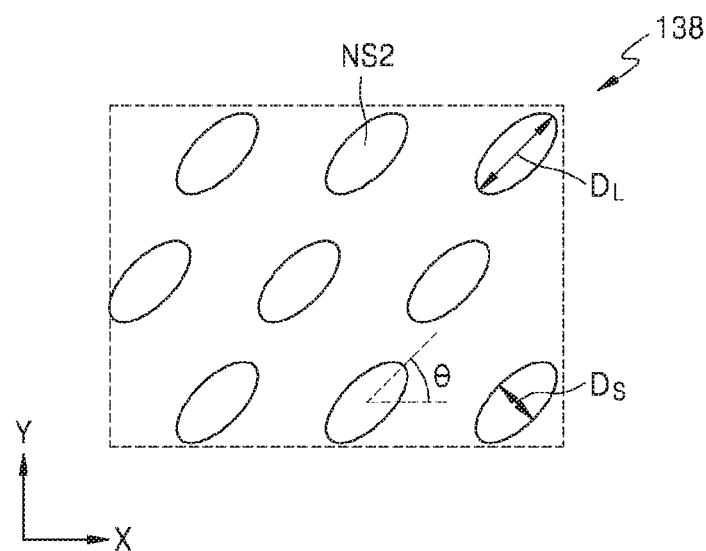
FIG. 16 is an enlarged plan view illustrating a portion of a second region of the structured light pattern mask of FIG. 13.

FIG. 13 is a cross-sectional view illustrating a configuration of a structured light projector 101 according to an example embodiment. FIG. 14 is a cross-sectional view of a structured light pattern mask 131 used in the structured light projector 101 of FIG. 13. FIG. 15 is an enlarged plan view illustrating a portion C of a first region 136 of the structured light pattern mask 131 of FIG. 13. FIG. 16 is an enlarged plan view illustrating a portion B of a second region 138 of the structured light pattern mask 131.

According to an example embodiment, a plurality of light-emitting elements 124 constituting the light source 120 may emit light of a third polarization, and the structured light pattern mask 131 may include the first region 136 for changing a polarization of incident light into the first polarization P1 and the second region 138 for changing a polarization of incident light into the second polarization P2.

The first region 136 may form structured light by changing the light of the third polarization emitted by the light source 120 into the first polarization P1. The first region 136 may include a plurality of nanostructures NS1. A shape of the first region 136 may be determined to form a desired structured light pattern. Although the first regions 136 having the same shape are repeatedly formed in FIG. 14, example embodiments are not limited thereto, and the first regions 136 having various shapes may be distributed randomly, periodically, or pseudo-periodically. The light of the third polarization emitted by the light source 120 may pass through the first region 136 and may be changed into the first polarization P1. Also, since predetermined structured light is formed according to a shape of the first region 136, the first structured light SL1 formed of the light of the first polarization P1 may be formed by the first region 136.

The second region 138 may also change a polarization of incident light. For example, the second region 138 may change the light of the third polarization emitted by the light source 120 into the light of the second polarization P2. The second region 138 may include a plurality of nanostructures NS2 to change the light of the third polarization into the light of the second polarization.

The second region 138 may also have a pattern for forming predetermined structured light. The light of the third polarization emitted by the light source 120 may be modulated into the second structured light SL2 formed of the light of the second polarization P2 by passing through the second region 138. A portion of the structured light pattern mask 131 other than the first region 136 may become the second region 138, and the first region 136 and the second region 138 have complementary patterns. Accordingly, the second structured light SL2 formed by passing through the second region 138 may have a pattern complementary to that of the first structured light SL1.

Example shapes and arrangements of the nanostructures NS1 and NS2 of predetermined requirements provided in the first region 136 and the second region 138 are illustrated in FIGS. 6A through 6C.

The nanostructures NS1 provided in the first region 136 and the nanostructures NS2 provided in the second region 138 may be different in at least one of a shape and an arrangement. For example, as shown in FIGS. 15 and 16, the nanostructures NS2 of the second region 138 may be arranged as if the nanostructures NS1 of the first region 136 is rotated by θ. That is, an angle between a major axis $D_x$ of each of the nanostructures NS1 and a major axis $D_L$ of each of the nanostructures NS2 may be θ. However, the present embodiment is not limited thereto. For example, the nanostructure NS1 of the first region 136 and the nanostructure NS2 of the second region 138 may have the same major axis direction and different aspect ratios, the aspect ratio being a ratio between the major axis and the minor axis.

Figure 17:
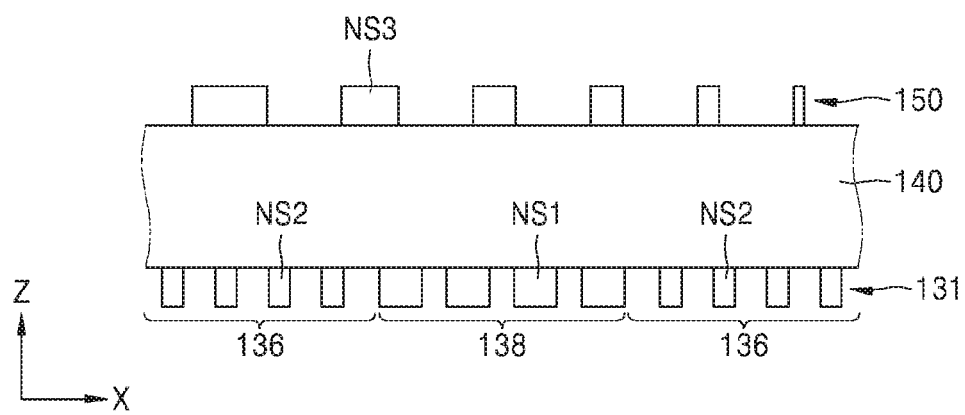
FIG. 17 is a partially enlarged cross-sectional view of the structured light projector of FIG. 13, illustrating that the structured light pattern mask and the polarization multiplexing deflector are respectively formed on both surfaces of the transparent substrate.

FIG. 17 is a partially enlarged cross-sectional view of the structured light projector 101 of FIG. 13, illustrating that the structured light pattern mask 131 and the polarization multiplexing deflector 150 are respectively formed on opposite surfaces of the transparent substrate 140.

The structured light pattern mask 131 may be located on a surface facing the light source 120 from the opposite surfaces of the transparent substrate 140, and the polarization multiplexing deflector 150 may be located on the other surface of the transparent substrate 140.

The plurality of nanostructures NS1 and NS2 provided in the first region 136 and the second region 138 of the structured light pattern mask 131, respectively, may be formed on a surface of the transparent substrate 140, and the plurality of nanostructures NS3 provided on the polarization multiplexing deflector 150 may be formed on the other surface of the transparent substrate 140. Based on this monolithic structure, the structured light projector 101 may be made more compact and small.

Figure 18:
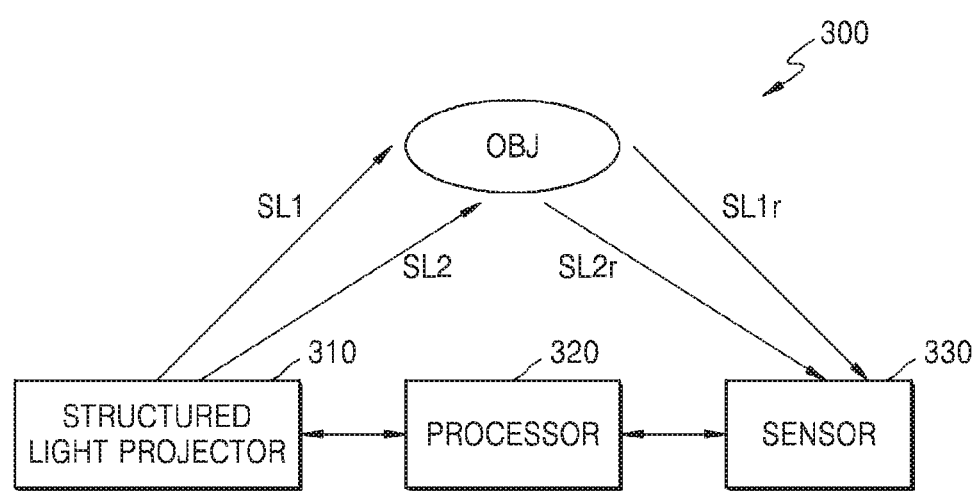
FIG. 18 is a block diagram illustrating a configuration of an electronic apparatus according to an example embodiment.

FIG. 18 is a block diagram illustrating a configuration of an electronic apparatus 300 according to an example embodiment.

The electronic apparatus 300 includes a structured light projector 310 configured to emit the first structured light SL1 and the second structured light SL2 to an object OBJ, a sensor 330 configured to receive light reflected from the object OBJ, and a processor 320 configured to perform an operation for obtaining shape information of the object OBJ from pieces of light SL1r and SL2r received by the sensor 330.

The structured light projector 100 or 101 may be used as the structured light projector 310. Since the structured light projector 310 forms the first structured light SL1 of a first polarization and the second structured light SL2 of a second polarization by using light emitted by a light source and deflects the first structured light SL1 and the second structured light SL2 to different directions, a wider field of view may be achieved when light is emitted to the object OBJ.

The sensor 330 may sense the pieces of structured light SL1r and SL2r reflected by the object OBJ. The sensor 330 may include an array of light detection elements. The sensor 330 may further include a light dispersing element for analyzing light reflected from the object OBJ according to wavelengths.

The processor 320 may obtain depth information of the object OB by comparing the pieces of structured light SL1 and SL2 emitted to the object OBJ with the pieces of structured light SL1r and SL2r reflected from the object OBJ, and may analyze a 3D shape, a position, and a movement of the object OBJ. Each of the pieces of structured light SL1 and SL2 generated by the structured light projector 310 may be a pattern mathematically coded so that an angle and a direction of a ray of light and position coordinates of bright and dark points reaching a predetermined focal plane are unique. When such a pattern is reflected by the object OBJ having a 3D shape, a pattern of each of the reflected pieces of SL1r and SL2r may be different from a pattern of each of the pieces of structured light SL1 and SL2. Depth information of the object OBJ may be extracted by comparing the patterns and tracking patterns according to coordinates, and 3D information related to a shape and a movement of the object OBJ may be extracted from the depth information.

The processor 320 may control an overall operation of the electronic apparatus 300, and may drive a light source provided in the structured light projector 310 or may control an operation of the sensor 330.

The electronic apparatus 300 may further include a memory, and a computation module programmed in order for the processor 320 to perform an operation for extracting 3D information may be stored in the memory.

Optical devices for adjusting directions of the pieces of structured light SL1 and SL2 to guide the pieces of structured light SL1 and SL2 from the structured light projector 310 toward the object OBJ or performing additional modulation may be further located between the structured light projector 310 and the object OBJ.

Information about an operation result of the processor 320, that is, a shape and a position of the object OBJ, may be transmitted to another unit or another electronic apparatus. For example, the information may be used by another application module stored in the memory. The other electronic apparatus to which the operation result is transmitted may be a display apparatus or a printer that outputs the operation result. In addition, the other electronic apparatus may be, but is not limited to, an autonomous driving device such as a self-driving vehicle, an autonomous vehicle, a robot, or a drone, a smartphone, a smart watch, a mobile phone, a personal digital assistant (PDA), a laptop, a personal computer (PC), any of various wearable devices, any of other mobile or non-mobile computing devices, and an Internet of things device.

The electronic apparatus 300 may be, but is not limited to, an autonomous driving device such as a self-driving vehicle, an autonomous vehicle, a robot, or a drone, a smartphone, a smart watch, a mobile phone, a personal digital assistant (PDA), a laptop, a PC, any of various wearable devices, other mobile or a non-mobile computing devices, or an Internet of things (IoT) device.

Methods that are implemented as software modules or algorithms in an electronic apparatus according to the one or more example embodiments may be stored as program instructions or computer-readable code executable on a processor in a computer-readable recording medium. Examples of the computer-readable recording medium include magnetic storage media (e.g., read-only memories (ROMs), random-access memories (RAMs), floppy disks, or hard disks) and optical recording media (e.g., compact disk (CD)-ROMs, or digital versatile disks (DVDs)). Also, the computer-readable recording medium may be distributed over network-coupled computer systems so that computer-readable code is stored and executed in a distributive manner. The medium may be read by a computer, may be stored in a memory, and may be executed by a processor.

The above-described structured light projector may generate different types of structured light according to polarizations and may project the different types of structured light to different directions according to example embodiments.

The above-described structured light projector may provide structured light with high light efficiency and a wide field of view according to example embodiments.

The above-described structured light projector may be used in various electronic apparatuses. For example, the above-described structured light projector may be used in a 3D object recognition apparatus and may improve 3D recognition efficiency.

While the present disclosure has been particularly shown and described with reference to example embodiments thereof, the example embodiments have merely been used to explain the present disclosure and should not be construed as limiting the scope of the present disclosure as defined by the claims. The example embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

What is claimed is:

1. A structured light projector comprising:
a light source configured to emit light;
a structured light pattern mask configured to receive the light emitted by the light source, the structured light pattern mask comprising a first region configured to generate a first structured light having a first polarization and a second region configured to generate a second structured light having a second polarization that is different from the first polarization; and
a polarization multiplexing deflector configured to deflect the first structured light and the second structured light generated by the structured light pattern mask, to different directions, respectively,
wherein at least one of the first region and the second region comprises a plurality of nanostructures.

2. The structured light projector of claim 1, wherein the first region is disposed in a region other than a region where the second region is disposed in the structured light pattern mask.

3. The structured light projector of claim 1, wherein the first region is a transparent region, and
the second region comprises the plurality of nanostructures having a shape distribution configured to change a polarization of the light emitted by the light source into the second polarization.

4. The structured light projector of claim 3, wherein each of the plurality of nanostructures have elliptic cylindrical shape.

5. The structured light projector of claim 4, wherein, in the elliptic cylindrical shape, a length of a major axis and a length of a minor axis are determined so that a difference between phase shifts of two electric field components of incident light that are along the major axis and the minor axis of the elliptic cylindrical shape, respectively is $\pi$.

6. The structured light projector of claim 3, wherein each of the plurality of nanostructures have asymmetric polygonal prism cross-sectional shape.

7. The structured light projector of claim 1, wherein the first region comprises a plurality of first nanostructures, each of the plurality of first nanostructures having a sub-wavelength dimension that is less than a wavelength of the light emitted by the light source, and
the second region comprises a plurality of second nanostructures, each of the plurality of second nanostructures having the sub-wavelength dimension.

8. The structured light projector of claim 7, wherein the plurality of first nanostructures of the first region have a shape distribution configured to change a polarization of the light emitted by the light source into the first polarization, and
the plurality of second nanostructures of the second region have a shape distribution configured to change the polarization of the light emitted by the light source into the second polarization.

9. The structured light projector of claim 8, wherein the plurality of first nanostructures and the plurality of second nanostructures have elliptic cylindrical cross-sectional shapes with a major axis and a minor axis, respectively, and the plurality of first nanostructures and the plurality of second nanostructures are different from each other in at least one of a direction of the major axis and an aspect ratio, the aspect ratio being a ratio between a length of the major axis and a length of the minor axis.

10. The structured light projector of claim 9, wherein the plurality of first nanostructures and the plurality of second nanostructures have a same aspect ratio, wherein the major axis of each of the plurality of second nanostructures is inclined at a predetermined angle with respect to the major axis of each of the plurality of first nanostructures.

11. The structured light projector of claim 8, wherein the plurality of first nanostructures and the plurality of second nanostructures have asymmetric polygonal prism cross-sectional shapes having a major axis and a minor axis, respectively, and the plurality of first nanostructures and the plurality of second nanostructures are different from each other in at least one of a direction of the major axis and an aspect ratio, the aspect ratio being a ratio between a length of the major axis and a length of the minor axis.

12. The structured light projector of claim 7, wherein the plurality of first nanostructures of the first region have a shape distribution configured to preserve a polarization of the light emitted by the light source as the first polarization, and the plurality of second nanostructures of the second region have a shape distribution configured to change the polarization of the light emitted by the light source into the second polarization.

13. The structured light projector of claim 12, wherein the plurality of first nanostructures have circular cylindrical cross-sectional shapes, and the plurality of second nanostructures have elliptic cylindrical cross-sectional shapes with a major axis and a minor axis.

14. The structured light projector of claim 1, wherein the first polarization and the second polarization are linear polarizations that are perpendicular to each other.

15. The structured light projector of claim 1, wherein one of the first polarization and the second polarization is a left-handed circular polarization and the other one is a right-handed circular polarization.

16. A structured light projector comprising:
a light source configured to emit light;
a structured light pattern mask configured to receive the light emitted by the light source, the structured light pattern mask comprising a first region configured to generate a first structured light having a first polarization and a second region configured to generate a second structured light having a second polarization that is different from the first polarization; and
a polarization multiplexing deflector configured to deflect the first structured light and the second structured light generated by the structured light pattern mask, to different directions, respectively,
wherein the polarization multiplexing deflector comprises a plurality of third nanostructures having a first axis and a second axis, each of the plurality of third nanostructures having a sub-wavelength dimension that is less than a wavelength of the light emitted by the light source.

17. The structured light projector of claim 16, wherein a shape distribution of the plurality of third nanostructures is determined so that a transmission phase distribution varies based on a polarization of incident light.

18. The structured light projector of claim 16, wherein each of the plurality of third nanostructures have asymmetric cross-sectional shapes based on a direction of the first axis being different from a direction of the second axis, and a first length of the first axis being different from a second length of the second axis.

19. The structured light projector of claim 18, wherein a distribution of the first length and a distribution of the second length of each of the plurality of third nanostructures are different from each other.

20. The structured light projector of claim 1, further comprising a transparent substrate comprising a first surface facing the light source and a second surface opposite to the first surface,
wherein the structured light pattern mask is disposed on the first surface, and
the polarization multiplexing deflector is disposed on the second surface.

21. An electronic apparatus comprising:
a structured light projector;
a sensor configured to receive light from an object which is irradiated with light emitted by the structured light projector; and
a processor configured to obtain shape information of the object based on the light received by the sensor,
wherein the structured light projector comprises:
a light source configured to emit light;
a structured light pattern mask configured to receive the light emitted by the light source, the structured light pattern mask comprising a first region configured to generate a first structured light having a first polarization and a second region configured to generate a second structured light having a second polarization that is different from the first polarization; and
a polarization multiplexing deflector configured to deflect the first structured light and the second structured light generated by the structured light pattern mask, to different directions, respectively.

22. The structured light projector of claim 3, wherein the shape distribution including at least one of a shape, a size, and a pitch of each of the plurality of nanostructures, respectively.

23. The structured light projector of claim 17, wherein the shape distribution includes at least one of a shape, a size, and a pitch of each of the plurality of third nanostructures, respectively.

24. A structured light projector comprising:
a light source configured to emit light;
a structured light pattern mask configured to receive the light emitted by the light source, the structured light pattern mask comprising a first region configured to generate a first structured light having a first polarization, and a second region configured to generate a second structured light having a second polarization that is different from the first polarization; and
a polarization multiplexing deflector configured to deflect the first structured light and the second structured light generated by the structured light pattern mask, to different directions, respectively, wherein the first region comprises a plurality of first nanostructures, and the polarization multiplexing deflector comprises a plurality of third nanostructures.

25. The structured light projector of claim 24, wherein the second region comprises a plurality of second nanostructures.

26. The structured light projector of claim 25, wherein an angle between a major axis of each of the plurality of first nanostructures and a major axis of each of the plurality of second nanostructures is a predetermined angle.

* * * * *